US009538384B2

United States Patent
Donnellan et al.

(10) Patent No.: US 9,538,384 B2
(45) Date of Patent: Jan. 3, 2017

(54) METHOD AND APPARATUS FOR A DEVICE MANAGEMENT APPLICATION

(71) Applicant: Cellco Partnership, Basking Ridge, NJ (US)

(72) Inventors: Kevin Donnellan, North Brunswick, NJ (US); Stephen Joseph Barna, Chatham, NJ (US); Erica A Martinez, Mountainside, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 45 days.

(21) Appl. No.: 14/015,659

(22) Filed: Aug. 30, 2013

(65) Prior Publication Data

US 2015/0067785 A1  Mar. 5, 2015

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04W 12/12 | (2009.01) | |
| H04W 12/06 | (2009.01) | |

(52) U.S. Cl.
CPC ............. *H04W 12/12* (2013.01); *H04W 12/06* (2013.01)

(58) Field of Classification Search
CPC ...................................................... H04L 63/08
USPC ............................................................ 726/4
See application file for complete search history.

(56) References Cited

U.S. PATENT DOCUMENTS

| | | | | |
|---|---|---|---|---|
| 7,832,008 | B1 * | 11/2010 | Kraemer | ........................... 726/22 |
| 8,634,808 | B1 * | 1/2014 | Zhong | ..................... H04M 1/66 |
| | | | | 340/5.8 |
| 2005/0272405 | A1 * | 12/2005 | Tomlinson et al. | ......... 455/404.2 |
| 2006/0282660 | A1 * | 12/2006 | Varghese | .............. G06Q 20/341 |
| | | | | 713/155 |
| 2009/0271844 | A1 * | 10/2009 | Zhang et al. | ...................... 726/2 |
| 2010/0125657 | A1 * | 5/2010 | Dowling et al. | ............... 709/224 |
| 2010/0205667 | A1 * | 8/2010 | Anderson | ............... G06F 3/013 |
| | | | | 726/19 |
| 2011/0053559 | A1 * | 3/2011 | Klein | ............................ 455/411 |
| 2013/0312106 | A1 * | 11/2013 | Reeves et al. | ................... 726/26 |
| 2014/0013455 | A1 * | 1/2014 | Berger | .................... G06F 21/55 |
| | | | | 726/36 |
| 2014/0082727 | A1 * | 3/2014 | Chen et al. | ...................... 726/23 |
| 2014/0123325 | A1 * | 5/2014 | Jung et al. | ....................... 726/30 |
| 2014/0282908 | A1 * | 9/2014 | Ward et al. | ......................... 726/4 |
| 2014/0337867 | A1 * | 11/2014 | Wilson | .................... G01S 19/14 |
| | | | | 725/9 |

OTHER PUBLICATIONS

Lalana Kagal; A Policy Language for a Pervasive Computing Environment; University of Maryland; p. 1-13; Year: 2003.*

* cited by examiner

*Primary Examiner* — Monjour Rahim

(57) ABSTRACT

An approach for implementing a local device management application for deterring misuse, loss, or theft of mobile devices includes determining that a use of a first device at least substantially satisfies one or more use criteria. The approach also includes generating a notification message regarding the use. Further, the approach includes initiating a transmission of the notification message from the first device to a second device.

15 Claims, 11 Drawing Sheets

METHOD AND APPARATUS FOR A DEVICE MANAGEMENT APPLICATION

BACKGROUND INFORMATION

With technological advances in a broad range of mobile devices and applications, many users, companies, organizations, etc. utilize the mobile devices to perform various tasks throughout the day. For example, a mobile device (e.g., mobile phone, tablet, laptop computer, personal projectors, point of sale, etc.) and relevant applications may be utilized to access or provide services for entertainment, business transactions, education, healthcare, data processing, or the like. Some users may utilize various devices throughout the day to perform various personal or business related tasks, and some organizations/companies (e.g., of various sizes) may utilize and provide a broad range of mobile devices to their employees (e.g., shared or per user) for use in performing their tasks and duties. In order to control, manage, and service their devices and applications, some companies may utilize local or cloud-based (e.g. via a service provider) information technology (IT) services. The IT services may include controlling and tracking the use of the devices and applications as well as providing security measures for the physical devices and the data stored thereon so to mitigate any potential misuse, loss, or theft of the devices and data. Any misuse, loss, or theft can be detrimental and costly to users or owners of the devices. However, some users and companies may wish to have the flexibility in managing their devices via locally implemented methods with or without local or network-based IT services.

Based on the foregoing, there is a need for an approach to implement a local device management mechanism for deterring misuse, loss, or theft of mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for facilitating a local device management mechanism for deterring misuse, loss, or theft of mobile devices are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to a local device management application for deterring misuse, loss, or theft of mobile devices, it is contemplated that these embodiments have applicability to local, cloud-based, or hybrid platforms for managing various current or future types of devices.

Figure 1:
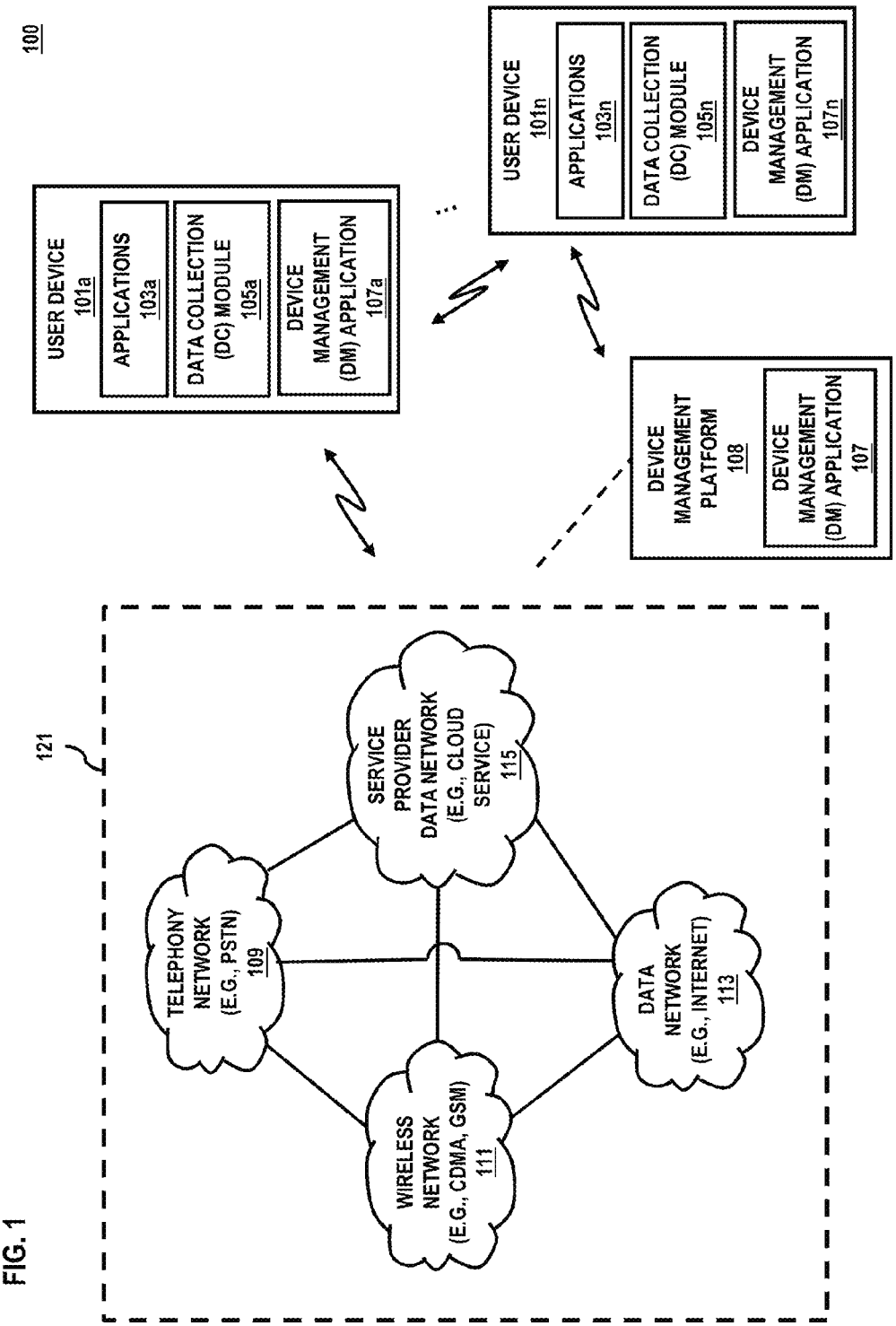
FIG. 1 is a diagram of a system capable of implementing a local device management mechanism for deterring misuse, loss, or theft of mobile devices, according to one embodiment.

FIG. 1 is a diagram of a system for implementing a local device management mechanism for deterring misuse, loss, or theft of mobile devices. As previously discussed, private or public users, companies, organizations, or the like (entities) may employ a broad range of mobile devices (device) and applications throughout the day to perform a variety of personal or professional tasks at one or more physical locations. Depending on the nature of tasks to be completed, one or more users may share one or more devices that may be capable of executing a variety of applications and using various data in performing the tasks. For example, a merchant may provide several devices (e.g., mobile scanners, tablets, etc.) to its employees (users) so that they can provide customer service and conduct point-of-sale tasks at the merchant's premises. In this example, the devices may include a variety of applications and may store various data associated with the merchant, his customers, or offered merchandise/services. In various scenarios, the users may share one or more of the devices in performing their tasks throughout the day, or each user may be assigned with a device, which the user may be responsible for. In some situations a user may leave a device unattended when he is not using it, or the user may be attending to another task that does not require the use of that device. In some settings, unattended devices may be lost or stolen causing loss of potentially detrimental data and a high cost for replacing the devices and the applications thereon. In other settings, some users may misuse their assigned devices or other unattended devices, which can translate to loss of time and productivity for an entity (e.g., a business, a group, a company, an organization, etc.) To prevent misuse, loss, or theft of the devices and any stored data, some entities may employ team members to provide local IT services to manage their devices, while other entities may utilize a combination of local IT and cloud-based IT services (e.g., offered by a service provider.) However, some entities may not have a large enough number of users or devices to justify the cost of employing a local IT team and/or the use of a cloud-based IT service. Nevertheless, entities with a plurality of devices and users may still wish to utilize some mechanism to locally track, manage, and deter misuse, loss, or theft of their devices and data.

To address these issues, system 100 of FIG. 1 provides the capability for implementing a local device management mechanism for deterring misuse, loss, or theft of mobile devices, according to one embodiment. As previously discussed, an entity may utilize a local device management application to track and deter misuse, loss, or theft of its mobile devices that may be used by various users for performing tasks and duties associated or approved by that entity. In one scenario, an administrator (e.g., a business owner) may establish a local device management mechanism (e.g., via a local network) to track the location of its mobile devices, which may have been provided to its employees for use in performing various tasks approved by the administrator. In one scenario, the administrator may wish to monitor how, when, or who is using those devices. The administrator of an entity may establish and monitor various use/trigger conditions that may indicate a potential misuse, a misplaced device (e.g., lost), a potential unauthorized user, a suspicious movement of a device (e.g. theft), etc. that may be associated with the devices of that entity. In one example, an administrator may install a local mobile device management application on all its devices where one or more of those devices may be designated as an administrative device for tracking and managing other devices of that entity. In various examples, the use/trigger conditions may be based on parameters associated with the types of the devices, purpose of use, nature of the entity (e.g., business type), number of devices, number of users, approved range of movement for the devices, characteristics of the physical location where the devices will be used at, or the like. In one example, a company may include 10 employees and 15 devices, where the devices may be of different types and may be shared by those employees when performing variety of tasks for the company and/or for its customers. Further, an administrator of the company may set up a use/trigger condition in a device management application to cause an alert if and when a device is left unattended for more than a certain time duration so that the administrative device or an administrator may take one or more actions to address that use/trigger condition. In one scenario, location of a device may be monitored to determine if the device is moved and if it is located within an approved area. In one embodiment, each device within a group of devices associated with an entity may have a different use/trigger condition. In one embodiment, the use/trigger condition may be associated with a use or a user of a device.

For the purpose of illustration, the system 100 may include one or more user devices 101a-101n (user device 101), which may include, execute, and utilize one or more applications 103a-103n (also referred to as applications 103), one or more data collection modules 105a-105n (also referred to as DC module 105), and device management applications 107a-107n (also referred to as DM application 107). In one embodiment, the DM applications 107 may be installed on a plurality of user devices 101 (e.g., associated with a particular location, organization, company, etc.) so that those devices may be monitored and managed by an administrator. In one scenario, in a group of user devices 101, one or more devices may perform additional functions for managing other devices within the group. An administrator/owner of a group of user devices 101 may designate one or more user devices 101 as administrative devices and the rest of the devices within the group as target devices. Depending on capabilities of the user devices 101 in a group, an administrative device and a target device may have similar, same, or different functionalities. For example, a group of user devices 101 may include a mobile phone, a tablet, a laptop computer, a barcode scanner, or the like.

In one embodiment, the system 100 may include a device management platform 108 to provide additional services for managing the user devices. In one embodiment, the device management platform 108 may be a standalone device (e.g., a computer, a server, etc.) dedicated to provide services for managing one or more user devices 101. In one embodiment, the device management platform 108 may utilize a DM application 107 to interface, track, monitor, control, etc. the user devices 101.

Furthermore, the system 100 may include a network system 121, which may include one or more networks, including a telephony network 109, a wireless network 111, a data network 113, a service provider data network 115, etc. By way of example, the networks 109, 111, 113, and 115 may be any suitable wireline and/or wireless network, which may be managed by one or more service providers. In one example, the networks 109, 111, 113, and 115 may be one or more elements in a network system 121, which may include various components and elements for providing a range of communication and network services. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (Wi-MAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109, 111, 113, and 115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 109, 111, 113, and 115 may include components and facilities to provide for signaling and/or bearer communications between the various components or facilities of system 100. In this manner, networks 109, 111, 113, and 115 may embody or include portions of a signaling system 7 (SS7) network, or other suitable infrastructure to support control and signaling functions.

By way of examples, the user devices 101 may communicate with other devices via one or more proximity-based communication channels, via the device management platform 108, or via one or more network service providers in the network system 121. Further, the applications 103 may include various applications for productivity, point-of-sale transactions, healthcare services, education, entertainment, social networking, web browser, communications, content sharing, multimedia applications, user interface (UI), map application, web client, or the like.

In one embodiment, a user device 101 may utilize a DC module 105 for determining and/or collecting data and/or content associated with the user device 101, one or more users of the user device 101, the applications 103, one or more content items (e.g., multimedia content), and the like. In addition, the user device 101 can execute an application 103 that is a software client for storing, processing, and/or forwarding one or more information items to other components of the system 100. In various embodiments, the DC module 105 may include various sensors for detecting and capturing various signals, information, and contents, for example, audio, video, location information, Bluetooth signals, near field communication (NFC) signals, RFID signals, or the like. Further, the collected information, content, or signals may be shared, via the applications 103 and/or the DM application 107, with other user devices 101, the device management platform 108, or service providers in the network system 121. In one embodiment, an audio or an optical sensor (e.g., a microphone, a camera, etc.) on a user device 101 may be utilized to capture an audio sample or an image of the immediate environment of the user device 101, which may be shared with other user devices 101, other target devices, administrative devices, the device management platform 108, or service providers in the network system 121.

It is noted that user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101 can support any type of interface for supporting the presentment or exchanging of data. In addition, user devices 101 may facilitate various input means for receiving and generating information, including touch screen capability, keyboard and keypad data entry, voice-based input mechanisms and the like. Any known and future implementations of user devices 101 are applicable. In certain embodiments, user devices 101 may be configured to establish peer-to-peer communication sessions with each other using a variety of technologies, including near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme.

In one embodiment, a DM application 107 may be utilized to locally manage one or more user devices 101, detect use or trigger conditions at any of the user devices 101, report the conditions to one or more user devices 101, or determine one or more actions in response to the detected conditions. A response may be based on one or more predefined rules for a given condition, or a response may be determined based on one or more inputs from one or more administrators or administrative devices. In one example, an administrator (e.g., a manager) may provide a response or issue a command to address a condition present at a target device. In various embodiments, the user devices 101 may communicate with each other via one or more proximity-based communication methods and protocols. For example, the communication may be via Bluetooth®, a wireless local area network (WLAN), or other available communication methods. In various examples, the DM application 107 may communicate with one or more networks and service providers of the network system 121 to provide information and/or request information or services from the service providers. In various scenarios, a DM application 107 on a user device 101 may request or utilize information from the applications 103 or the DC module 105 to determine environmental, use, or physical conditions associated with that user device 101. Additionally, the DM application 107 may determine one or more trigger conditions from the determined use conditions. In various embodiments, the DM application 107 on a target device may share the determined use conditions and/or the one or more trigger conditions with one or more other target devices, other nearby devices (e.g., a monitor, a projector, etc.), and/or an administrative device. In one use case scenario, the DM application 107 at a target device may receive its location information from its DC module 105 and determine a trigger condition if that target device is not within a designated location/area where it is supposed to be.

Upon determining the trigger condition, the DM application 107 may transmit that information to other target devices and/or administrative devices. In various scenarios, the trigger conditions may be caused when; for example, a user device 101 is left stationary at one location or in one position for a certain time duration, or when the device is moved from its current location, or when a certain application is executed on the target device, or when a certain user is using or is attempting to use the target device, or other conditions which may be defined and configured by an administrator of the target devices. In one embodiment, a DM application 107 may be configured to periodically provide various information and conditions to other target devices or to administrative devices. In one embodiment, the DM application 107 may store the various information and conditions (e.g., at a storage device at a user device 101), and then communicate the stored information to one or more other user devices 101, to an administrative device, and/or to a central repository at a later time. In one embodiment, a user device 101 may communicate information, requests, commands, etc. from an administrative device 101 to one or more other user devices 101. For example, a first target device may act as an intermediary for providing a communication link between an administrative device and a second target device, where the second target device may be able to communicate with the first target device, but not with the administrative device. In one embodiment, a DM application 107 at an administrative device may allow access to one or more administrative components/functions, which may be unavailable or locked at a DM application 107 of a target device.

Figure 2:
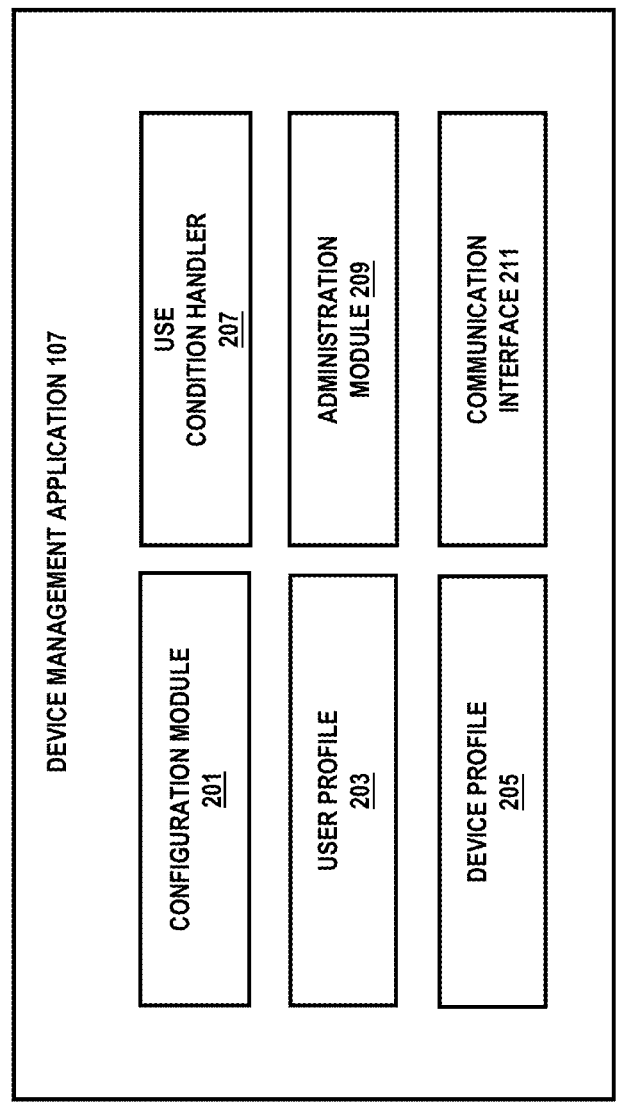
FIG. 2 is a diagram of the components of a local device management application, according to one embodiment.

FIG. 2 is a diagram of the components of a local device management application, according to one embodiment. By way of example, a DM application may include one or more components for facilitating device management procedures. The components may be implemented in hardware, firmware, software, or a combination thereof. It is contemplated that the functions of these components may be combined in one or more components or performed by other components of equivalent functionality. In one embodiment, the DM application 107 may include a configuration module 201, a user profile 203, a device profile 205, a use condition handler 207, administration module 209, and communication interface 211. The DM application 107 may be executed via one or more processors at a user device 101 and perform various tasks as a standalone application or in conjunction with various modules and applications at the user device 101.

In one embodiment, the configuration module 201 may facilitate configuration of user devices 101 when adding and activating new devices or reconfiguring existing devices. By way of example, the configuration module 201 operates in connection with the communication interface 211 to communicate with one or more other devices for effectuating the configuration. The configuration module 201 also enables an administrator/owner of the user devices 101 to locally or remotely configure a user device 101 as a regular user device or as an administrative device. This may include, for example, configuring a user device to allow access to the administration module 209 or interface/interact with a device management service (e.g., a cloud-based service) and update configuration information associated with various user devices 101 associated with the administrator/owner. In one embodiment, a configuration module 201 at a regular user device 101 may be used to configure that device. In one embodiment, the configuration module 201 at an administrative device may be used to configure that administrative device as well one or more other user devices 101. A configuration module 201 may interact with the user profile 203 and device profile 205 to provide various information and criteria associated with one or more users and one or more user devices 101. Further, the configuration module 201 may also inform other administrator or target devices that a new administrator/target device has been configured and added to the current group of user devices. This may include, for example, directing notification messages to one or more newly added administrative devices.

In one embodiment, the user profile 203 may include information associated with one or more users who may be authorized to use a particular user device 101. In one example, the user profile information may be provided by an administrative device where some of the information may be restricted for access or modification only by an administrative device. In one example, a user may have privileges to change some of the user profile information. In one scenario, a user profile may indicate user privileges to access or use various applications or resources available at or via the user device, which may be available via an administrator/owner network services.

In one embodiment, the device profile 205 may include device information indicative of available resources, applications, services, or the like, which may be available at the device or via the device. For example, a user may utilize various applications available at a user device 101 or the user may utilize the user device 101 to access various applications, services, resources, or the like that may be available via a local or cloud-based network service. In one embodiment, a user device profile may be associated with one or more user profiles who may share that user device, wherein a user profile may indicate as to how, where, or when a user may access or utilize the user device. Additionally, the device profile may include or have access to information associated with various applications that a user may use or attempt to use at/via the user device. For example, the applications may be indicated in various lists with information on whether the applications may be accessed or utilized at the user device. In one scenario, an administrator/owner may maintain a black list that may include various applications/services which may not be accessed or utilized at or via a user device associated with the administrator/owner. In another scenario, applications/services on a white list may indicate that a user may access and utilize those applications. In one example, applications/services on a gray list may indicate that a user may need to request authorization from an administrator/owner before using those listed applications/services. In one embodiment, the device profile may include location information where a user device may be utilized, stored, moved to, or the like.

The use condition handler 207 may detect use conditions present at a user device 101 and analyze the use conditions according to the configuration, user profile, device profile, or the like associated with the user device 101. In one embodiment, if any of the parameters, criteria, conditions, etc. are violated, then the use condition handler 207 may generate a use or trigger condition. In various embodiments, a use or trigger condition at a user device 101 may cause the DM application 107, the applications 103, and/or the DC module 105 of the user device 101 to initiate one or more actions. For example, the DM application 107 may request information associated with the user device 101 from the applications 103 or the DC module 105, which may be utilized to determine an appropriate action to address the use condition.

In one embodiment, the administration module 209 may receive information about a use condition present at a user device 101 and determine one or more actions to address the use condition. In one example, the use condition may indicate that a user of the user device is attempting to use or is using an unauthorized application/service. In one scenario, administration module 209 may present a notification message at the user device indicating that the use of the application/service is unauthorized, where a notification message indicative of the use condition may also be transmitted to one or more administrative devices. In one embodiment, the administration module 209 may perform one or more predefined actions to address a present use condition at the user device. In one embodiment, an administrative device may transmit one or more actions to address a use condition present at a user device, wherein the administration module 209 of the user device may receive, process, and execute the one or more actions. In one example, a use condition may indicate that a user device is being moved from a previous position or a location and the configuration information of the user device may indicate that such a move would need to be authenticated. In one use case scenario, sensor information of a user device 101 may indicate a movement of the user device where the administration module 209 may present an authentication request at the user device for a user/person moving the user device to provide authentication credentials. In one embodiment, the administration module 209 may interface with one or more local/remote administrative devices or cloud-based service providers for monitoring and managing one or more user devices 101. In one embodiment, the administration module 209 may be configured with information of one or more administrative devices/services, which may be notified when a use condition is determined at the user device.

In one embodiment, the communication interface 211 may be utilized to communicate with various applications, modules, or components of a user device 101 for sharing various information associated with the user device 101. In one embodiment, the DM application 107 may utilize the communication interface 211 to directly communicate with one or more other user devices 101, administrative devices, device management systems/services, or the like. In one scenario, the communication may be effectuated via a communication module available at the user device 101.

Figure 3:
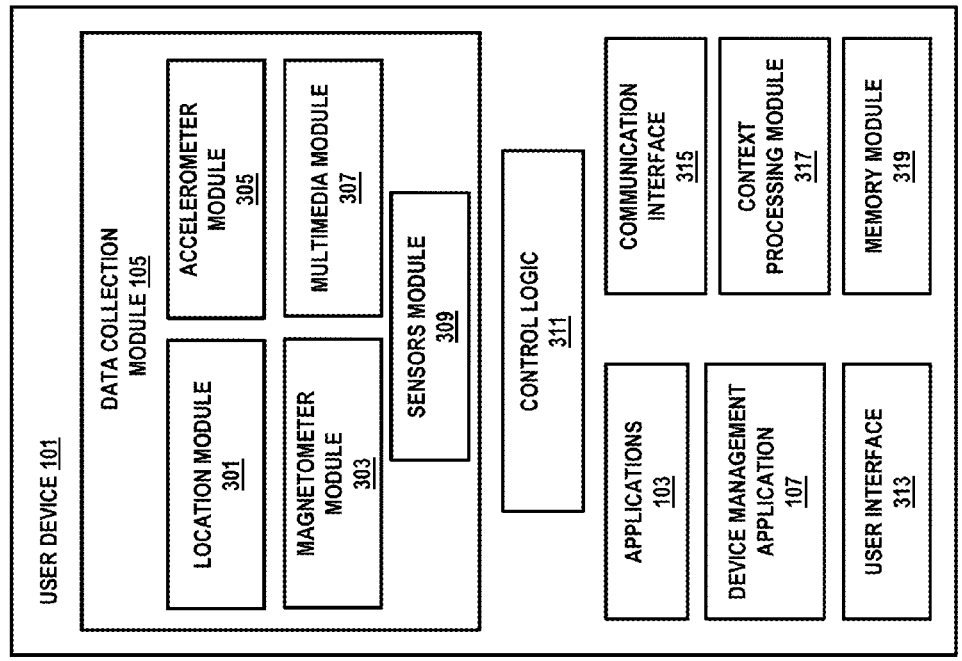
FIG. 3 is a diagram of the components of a user device capable of supporting local device management, according to one embodiment.

FIG. 3 is a diagram of the components of a user device capable of supporting local device management, according to one embodiment. By way of example, a user device 101 includes one or more components for executing various applications for enabling various functionalities at the user device 101 and for communicating with other user devices 101 or with other components of the system 100. It is contemplated that the functions of these components may be combined in one or more components or performed by other components of equivalent functionality. In one embodiment, the user device 101 includes a DC module 105, which may include one or more location modules 301, magnetometer modules 303, accelerometer modules 305, multimedia module 307, and sensors module 309. Further, the user device 101 may also include control logic 311 to coordinate the use of other components of the user device 101, a user interface 313, a communication interface 315, a context processing module 317, and a memory module 319. The applications 103 and the DM application 107 may execute on the control logic 311 utilizing the components of the user device 101.

The location module 301 can determine a user's location, for example, via location of a user device 101. The user's location can be determined by a triangulation system such as GPS, assisted GPS (A-GPS), Cell of Origin, or other location extrapolation technologies. Standard GPS and A-GPS systems can use satellites to pinpoint the location of a user device 101. A Cell of Origin system can be used to determine the cellular tower that a cellular user device 101 is synchronized with. This information provides a coarse location of the user device 101 because the cellular tower can have a unique cellular identifier (cell-ID) that can be geographically mapped. The location module 301 may also utilize multiple technologies to detect the location of the user device 101. Location coordinates (e.g., GPS coordinates) can give finer detail as to the location of the user device 101 when media is captured. In one embodiment, GPS coordinates are stored as context information in the memory module 319 and are available to the context processing module 317, the DC module 105, and/or to other entities of the system 100 (e.g., via the communication interface 315.) Moreover, in certain embodiments, the GPS coordinates can include an altitude to provide a height. In other embodiments, the altitude can be determined using another type of altimeter. In certain embodiments, the location module 301 can be a means for determining a location of the user device 101, an image, or used to associate an object in view with a location.

The magnetometer module 303 can be used in finding horizontal orientation of the user device 101. A magnetometer is an instrument that can measure the strength and/or direction of a magnetic field. Using the same approach as a compass, the magnetometer is capable of determining the direction of a user device 101 using the magnetic field of the Earth. The front of a media capture device (e.g., a camera) can be marked as a reference point in determining direction. Thus, if the magnetic field points north compared to the reference point, then the angle of the user device 101 from the magnetic field is known. Simple calculations can be made to determine the direction of the user device 101. In one embodiment, horizontal directional data obtained from a magnetometer can be stored in memory module 319, made available to other modules and/or applications 103 of the user device 101, and/or transmitted via the communication interface 315 to one or more entities of the system 100.

The accelerometer module 305 can be used to determine vertical orientation of the user device 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a user device 101 is stationary, the accelerometer module 305 can determine the angle the user device 101 is pointed as compared to Earth's gravity. In certain embodiments, the magnetometer module 303 and accelerometer module 305 can be means for ascertaining a perspective of a user. This perspective information may be stored in the memory module 319, made available to other modules and/or applications 103 of the user device 101, and/or sent to one or more entities of the system 100.

In one embodiment, the multimedia module 307 may be utilized to capture various media items, for example, images, video, audio, and the like, wherein the captured media may be submitted to one or more modules and applications of the user device 101, an administrative device, the device management platform 108, or a service provider for further processing, storage, sharing, and the like. In various embodiments, the captured media may be shared with the applications 103 or the DM application 107, which in turn may share captured media with one or more components of the system 100. In various embodiments, the multimedia module 307 may interface with various sensors; for example, a camera, a microphone, etc., to capture the media items at a user device 101.

In various embodiments, the sensors module 309 can process sensor data from various sensors (e.g., microphone, optical, Bluetooth, NFC, GPS, accelerometer, gyroscope, thermometer, etc.) to determine environmental (e.g., atmospheric) conditions surrounding the user device 101, user mood, location information, and various other information from a range sensors that may be available on one or more devices. For example, the sensors module 309 may detect conditions including humidity, temperature, geo-location, biometric data of the user, etc. Once again, this information can be stored in the memory module 319 and sent to the context processing module 317 and/or to other entities of the system 100. In certain embodiments, information collected from the DC module 105 can be retrieved by the control logic 311 and stored at the memory module 319, made available to other modules and/or applications 103 of the user device 101, and/or sent to one or more entities of the system 100. In one embodiment, the user device 101 may utilize a microphone and a camera sensor to capture audio signals, images, video available in the environment close user device 101, for example, record a short audio sample, they can picture of the surroundings, take a picture of the user who may be holding the user device 101, or the like.

The user interface 313 can include various methods for a user to interface with applications, modules, sensors, and the like at a user device 101. For example, the user interface 313 can have outputs including a visual component (e.g., a screen), an audio component, a physical component (e.g., vibrations), and other methods of communication. User inputs can include a touch-screen interface, a scroll-and-click interface, a button interface, a microphone, etc. An input may be via one or more methods such as voice input, textual input, typed input, typed touch-screen input, other touch-enabled input, etc.

In one embodiment, the communication interface 315 can be used to communicate with one or more entities of the system 100, for example, to submit a request for and receive a content stream from various content stream providers. In various embodiments, the communication interface 315 may facilitate communications via one or more wireless communication channels and protocols, for example, WLAN, RFID, NFC, Bluetooth Smart, Bluetooth, Ant+, Z-Wave, ZigBee, or the like, wherein the communication channels may be established via one or more sensors, transceivers, transmitters, receivers, wireless charging interface, or the like. Certain communications can be via methods such as an internet protocol, messaging (e.g., SMS, multimedia messaging service (MMS), etc.), or any other communication method (e.g., via the network system 121). In some examples, the user device 101 can send context information associated with the user device 101 to other user devices 101 and/or to other entities of the system 100.

The context processing module 317 may be executing on the control logic 311 for determining context information from the DC module 105, the applications 103, or the DM application 107. This information may be transmitted, via the communication interface 315, to one or more user devices 101 and/or to other entities of the system 100. The context processing module 317 may additionally be utilized as a means for determining information related to the user, an instance of data, a value, a content item, an object, a subject, an application 103 being executed, and the like. In certain embodiments, the context processing module 317 can infer higher level context information from the context data such as activity at a user device 101, user information, etc. In one example, date, time, location, and user information associated with a user device 101 at a particular time may be associated (e.g., as metadata) with content, activity, image, etc. that is captured at a user device 101.

Figure 4:
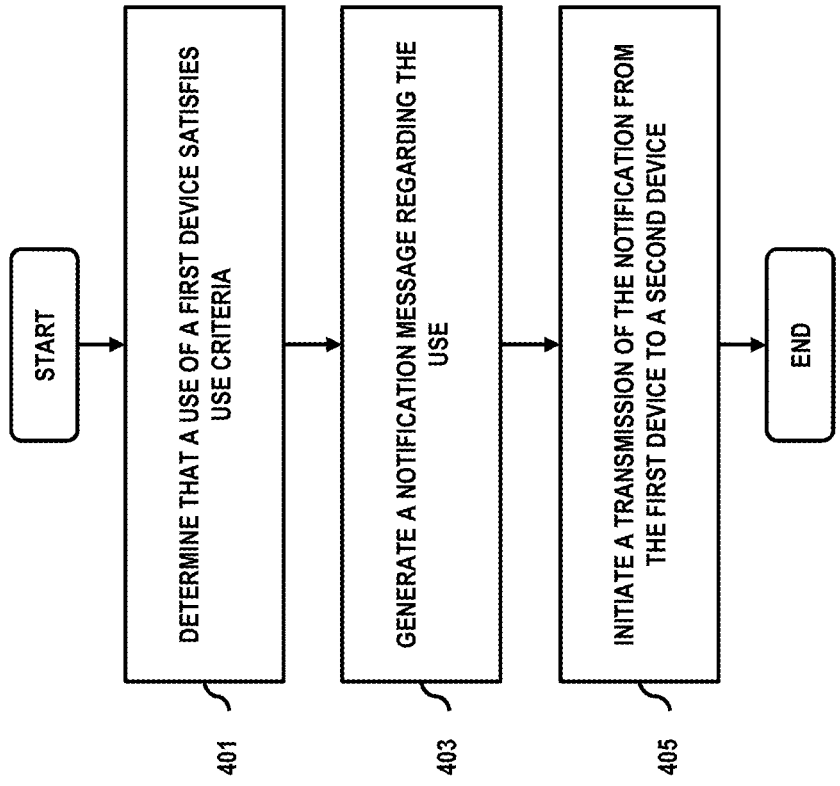
FIG. 4 is a flowchart of a process for determining use conditions of a device, according to one embodiment.

FIG. 4 is a flowchart of a process for determining use conditions of a device, according to one embodiment. For the purpose of illustration, process 400 is described with respect to FIG. 1. It is noted that the steps of the process 400 may be performed in any suitable order, as well as combined or separated in any suitable manner.

As shown in FIG. 4, in step 401, a DM application 107 may determine that a use of a first device at least substantially satisfies one or more use criteria. In one embodiment, the DM application 107 at a first user device 101 may determine that a use or trigger condition has occurred at the first user device 101. In one instance, information from the first user device 101 may indicate that the device has been moved from its current position or location. For example, motion sensors at the device may detect that a device resting on a desk was picked up or moved. In one instance, the trigger condition may be due to one or more applications 103 being executed on the first user device 101. For example, a user of the user device 101 may be executing or attempting to execute an application at the first user device 101. In one use case scenario, parameters for causing a trigger condition may be set and configured via the DM application 107 at a user device 101. For example, an administrator of the user devices 101 may determine the parameters for a group of user devices 101, which may be associated with a particular organization, company, location, etc. Further, the parameters may be set to trigger and for deterring misuse, loss, or theft, and protection of the user devices 101 and any data which may be stored on and/or which may be accessible by the user devices 101. In various scenarios, the user devices 101 may include a broad range of devices, for example, a mobile phone, a tablet, a laptop computer, a mobile point-of-sale device, a healthcare service related device, or the like.

In step 403, the DM application 107 may generate a notification message regarding the use. In one embodiment, the DM application 107 at the first user device 101 may generate one or more notification messages indicative of a use or trigger condition at the first user device 101 where the notification messages may include information received or determined from the applications 103 and/or the DC module 105. For example, a notification message may include information about how a user device 101 is being used, location information of the user device 101, user information of a user who may be using the user device 101, or the like.

In step 405, the DM application 107 may initiate a transmission of the notification message from the first device to a second device. In one embodiment, a DM application 107 on a first user device 101 may transmit to one or more other user devices (e.g., a manager's device) 101 the notification message related to the use or trigger condition present at the first user device 101. In one example, a DM application 107 may be configured with information as to which device or devices should the notification message be transmitted to. In one embodiment, a notification message may be transmitted via one or more proximity-based communication channels, an SMS message, and instant message, or the like.

Figure 5:
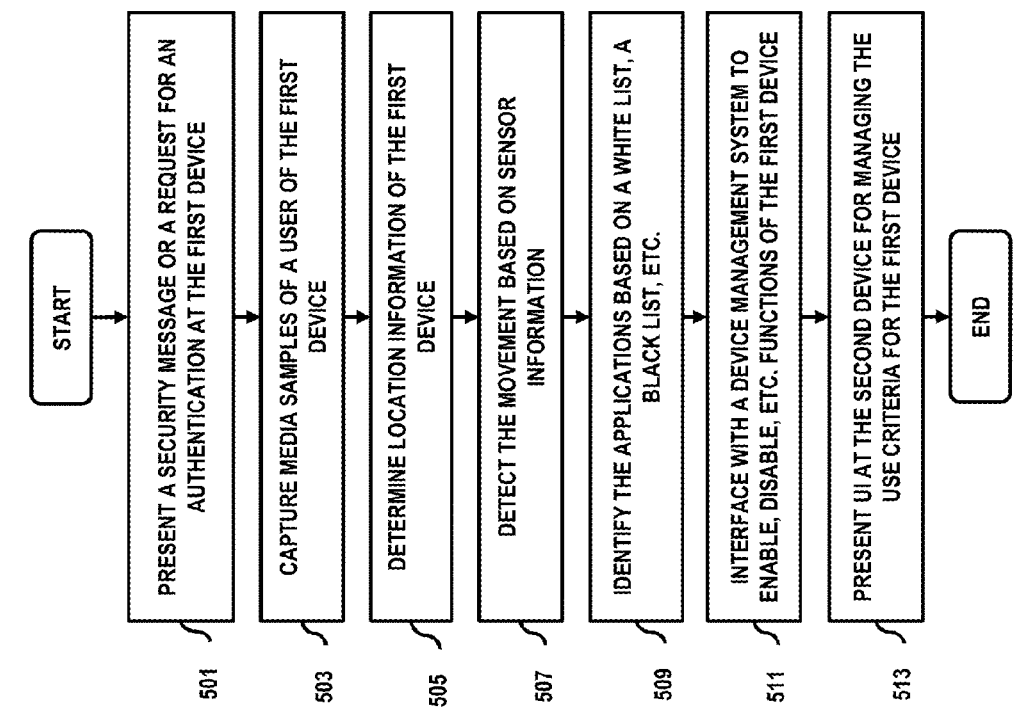
FIG. 5 is a flowchart of a process for managing one or more user devices, according to one embodiment.

FIG. 5 is a flowchart of a process for managing one or more user devices, according to one embodiment. For the purpose of illustration, process 500 is described with respect to FIG. 1. It is noted that the steps of the process 500 may be performed in any suitable order, as well as combined or separated in any suitable manner.

As shown in FIG. 5, in step 501, a DM application 107 may present a security message, a request for an authentication, or a combination thereof at the first device based on the use. In one embodiment, upon detecting the use or trigger condition at a first user device 101, the DM application 107 may cause the presentation of a security message or a request for an authentication at the first user device 101, which may be presented via the DM application 107 or the applications 103 at the user device 101. In one use case scenario, a security message may be presented at the display of the first user device 101 and indicate that an unauthorized condition at the first user device 101 has been detected. For example, the security message may state that the device is being moved from its current position, which is not an authorized move. In one scenario, when detecting a trigger condition, the DM application 107 may present a request for authentication at the first user device 101. For example, if a user may have picked up or moved a user device 101, a request for authentication may be presented at the user device 101 regardless if the user may have intended to use the user device 101. In one embodiment, the transmission of the notification message to the second device is initiated based on an expiration of a time period, a failure of the authentication, or a combination thereof. For example, a user device 101 may be configured with a time threshold value during which a user must provide authentication credentials at the user device 101, where if the authentication fails or is not provided in a timely manner, then the notification message may be transmitted to the second user device 101 to indicate an expired authentication period or an invalid authentication attempt. In one use case scenario, a user device 101 may be configured such that if the device is moved (e.g., picked up), then a valid authentication must be effectuated at the device within a given time specified in the configuration of the user device 101.

In step 503, the DM application 107 may cause a capture of one or more media samples of a user associated with the use of the first device with one or more internal sensors, one or more external sensors, or a combination thereof associated with the first device, wherein the notification message includes the one or more media samples. In one embodiment, the DM application 107 may request for the applications 103 or the DC module 105 to utilize available sensors at the first user device 101 and capture an image, a sound recording, biometric information, etc. associated with the user of the user device 101. In one embodiment, a DM application 107 at the first user device 101 and/or at one or more other user devices 101 may request for one or more other sensors, one or more other user devices 101, and/or other devices in close proximity to the first user device 101, to capture the one or more media samples. For example, the DM application 107 at a first user device 101 may detect a trigger condition on the first user device 101; however, the sensors at the first user device 101 may not be able to capture the one or more media samples (e.g., the sensors may be blocked, not functioning, etc.) Further, the DM application 107 at the first user device 101 or at one or more other user devices 101 may request for other nearby devices to capture an image, a sound recording, a video clip, etc. of the first user device 101 and a potential user of the first user device 101.

In step 505, the DM application 107 may determine location information associated with the first device, wherein the notification message includes the location information. In one embodiment, the DM application 107 may determine location information of a first user device 101 via the applications 103 and/or the DC module 105. For example, a trigger condition at a first user device 101 may indicate that the device is being moved or that there is an unauthorized use of the device. Further, the DM application 107 may include location information of that device in one or more notification messages, which may be transmitted to one or more other user devices 101, one or more service providers, one or more administrative devices, one or more authorities, or the like.

In step 507, where the one or more use criteria relate to a movement of the first device, the DM application 107 may detect the movement based on sensor information associated with the first device. In one embodiment, trigger conditions at a user device 101 may be based on a detection of a physical movement of the user device 101. For example, a motion sensor at the user device 101 may detect changes in vertical or horizontal orientation of the user device 101. In one example, an accelerometer sensor at the user device 101 may detect a movement of the user device 101. In one instance, if a user picks up a tablet which is situated on a desk, the sensors of that tablet may detect that movement.

In step 509, where the one or more use criteria relate to one or more applications used on the first device, the DM application 107 may include an identification of the one or more applications in the notification message based on a white list, a black list, or a combination thereof. In one embodiment, a use or a trigger condition at a user device 101 may be due to a use or an attempt to use one or more applications, one or more services, one or more local resources at the user device 101, one or more network resources, or the like. In one example, the applications, services, local/network resources, etc. may be included in one or more lists, which may be determined by an administrator of a user device 101. Further, the one or more lists may be determined based on one or more policies associated with an organization, a company, an entity, or the like which may have an administrative interest in the management of one or more user devices 101.

In step 511, a DM application 107 may interface with a device management system to enable, to disable, or a combination thereof one or more functions of the first device based on the use. In one embodiment, one or more user devices 101 may interface with a device management system, which may be local or remote, wherein the device management system may provide various capabilities for managing the one or more user devices 101. For example, the device management platform 108 may provide additional local or remote support (e.g., via a cloud-based service provider) for managing the user devices 101. In one scenario, the device management system may enable or disable one or more functions that may be available at a user device 101.

In step 513, a DM application 107 may present a user interface at the second device for managing the one or more use criteria for the first device. In one embodiment, a DM application 107 at a user device 101 may a user interface and user options for configuring and managing one or more use criteria of one or more other user devices 101. In one embodiment, the DM application 107 at one user device 101 may have the capability to enable or disable one or more functions at one or more other user devices 101. For example, an administrator of a group of user devices 101 (e.g., several tablets) may utilize a user device 101 (e.g. a mobile phone) to manage user devices 101 in that group.

Figure 6:
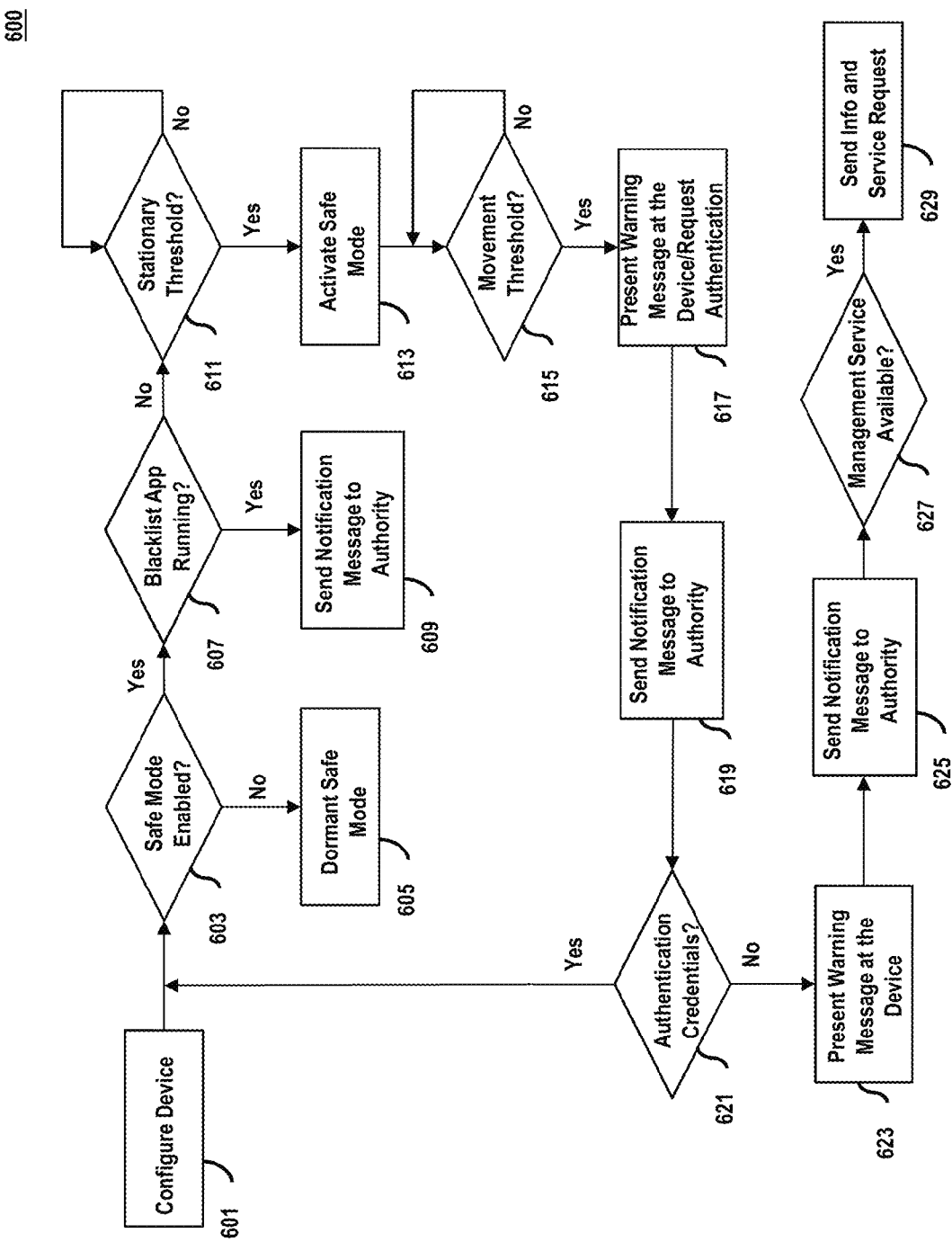
FIG. 6 is a flowchart of an example use case, according to one embodiment.

FIG. 6 is a flowchart of an example use case, according to one embodiment.

As discussed, a DM application 107 may be utilized to provide a mechanism to monitor and manage a plurality of user devices 101 associated with a group/organization at a given location. Process 600 is an example use case scenario where an administrator may monitor and manage a plurality of user devices 101 utilizing local and/or cloud-based applications or services. The process may begin at step 601 where an administrator or a service provider may determine and provide various criteria for locally/remotely configuring the DM applications 107 at one or more user devices associated with the administrator. In one embodiment, the DM applications 107 may be configured as for a regular user device (target device) and/or as for an administrative device, wherein an administrative device may include one or more privileges or rights for monitoring and managing one or more target devices. In one scenario, the configuration may include information on user devices which may be designated as an administrative device in a group of user devices 101. At 603, the DM application 107 may determine if a safe mode of operation at the DM application 107 and or at a target device is enabled and if the safe mode is not enabled, then at 605 the safe mode is placed in a dormant/sleep mode. In one embodiment, if the safe mode is enabled then at 607, the DM application 107 and/or the applications 103 may monitor and determine what applications (e.g., at the user device 101 or via a cloud-service) may be running at the target device or if any attempts are made to run those applications. In one scenario, applications being utilized at the target device may be compared to one or more black lists, white lists, or the like to determine if the applications are authorized for use on the target device, by a user of the target device, at the time when the application is used or attempted to be used, and the like. In one example, the use or an attempt to use an application on a black list may trigger a condition and at 609, a notification message may be sent to an authority/administrator indicating information associated with the user device 101, user of that device, the black list application, location information of the target device, a screenshot of the display of the target device, and/or other information according to the configuration parameters associated with that target device or its DM application 107. In one example, if there are no trigger conditions at 607, then the process may proceed to 611 where the DM application 107 may request/receive information from the DC module 105 to determine if the target device has been stationary for a predetermined time duration. For example, if a target device has been at the same location for 10 seconds or more, then a trigger condition may be set. In one example, if the target device is not stationary (e.g. a user may be using the device), then the process 600 may stay at 611 until there is a trigger condition.

However, if it is determined that the target device has been stationary for the predetermined time duration, then at 613, the DM application 107 may activate a safe mode of operation at the target device where access to the device may require authentication and/or other steps. For example, a tablet device may be left in a conference room for several minutes or hours where the DM application 107 may activate the safe mode of operation for security since the device may be unattended. At 615, the DM application 107 may receive information from the DC module 105 or from one or more sensors at the target device, which may indicate a movement of the target device beyond a predetermined time duration. For example, a user may pick up or move the above referenced tablet device, which was left in a conference room. In one example, the movement may be slight and for a very short period of time, which may be below a move threshold value (e.g., the tablet was just slid on a table in the conference room). In another example, a user or a person may move the target device for several seconds or minutes, which may meet the move threshold value, in which case at 617, the DM application 107 may present a warning message via a user interface at the target device indicating that a movement of the device has been detected. In one embodiment, the DM application 107 may present a request for authentication so that the user/person that may be moving the target device can provide authentication credentials at the target device. In one embodiment, the DM application 107 may cause one or more sensors at the target device, the DC module 105, and/or one or more other user devices in close proximity to the target device to capture media content (e.g., a picture, an audio sample recording, a video clip, etc.) associated with the immediate environment of the target device. For example, the media content may include a picture of a person/user who may be handling the target device, audio recording of sounds detectable in close proximity to the target device, a screenshot of the display of the target device, or the like. In one example, one or more items of the captured media content may be presented at the target device, at one or more other user devices 101, projector displays, television monitors, or the like, which can show to the person handling the user device 101 and to other potential users, the evidence associated with the person handling the target device.

Further, at 619 the DM application 107 may transmit (e.g., via SMS, email, instant chat, etc.) a notification message to the administrator/authority indicating that the target device is or has been moved from its previous location where the notification message may include information about the location (e.g., last, current, etc.) of the target device, the captured media content, last known user of the target device, last application used at the target device, status of the target device, etc. In one embodiment, the notification message may be sent to various user devices 101 which may be at a same or a different location than the target device. For example, the notification message may be sent to an administrative device 101 at the same location as the user device 101 or to an administrative device 101 which may be at a different location. At 621, the DM application 107 or the applications 103 at the target device may determine whether the requested authentication credentials (e.g., user ID, password, etc.) are provided at the target device, if so, are the authentication credentials valid. In one scenario, if the authentication credentials are valid and the process 600 may proceed to step 603 where monitoring of use or trigger conditions at the target device may continue. In one embodiment, if the authentication credentials are not valid, then at 623, the DM application 107 at the target device may present a warning message at the target device indicating that the target device is being monitored and tracked and that administrators and authorities will be notified. Further, at 625, a notification message including information about the status of the user device 101, the captured media content (e.g., picture of the person handling the device) may be sent to one or more authorities. For example, the information may be sent to a predetermined security/police authority. At 627, in one embodiment, the DM application 107 may determine if there are additional local or cloud-based services available for assisting with managing the target device. For example, an administrator of the target device may have access to a local device management system and/or cloud-based IT services. In one scenario, if there are additional services available, then at 629 the notification message, information and status of the target device may be sent to those services so that one or more actions may be initiated. For example, a device management system may issue one or more commands to the target device for monitoring, tracking, or disabling and enabling various features associated with the hardware, software, firmware, etc. of the user device 101.

Figure 7A:
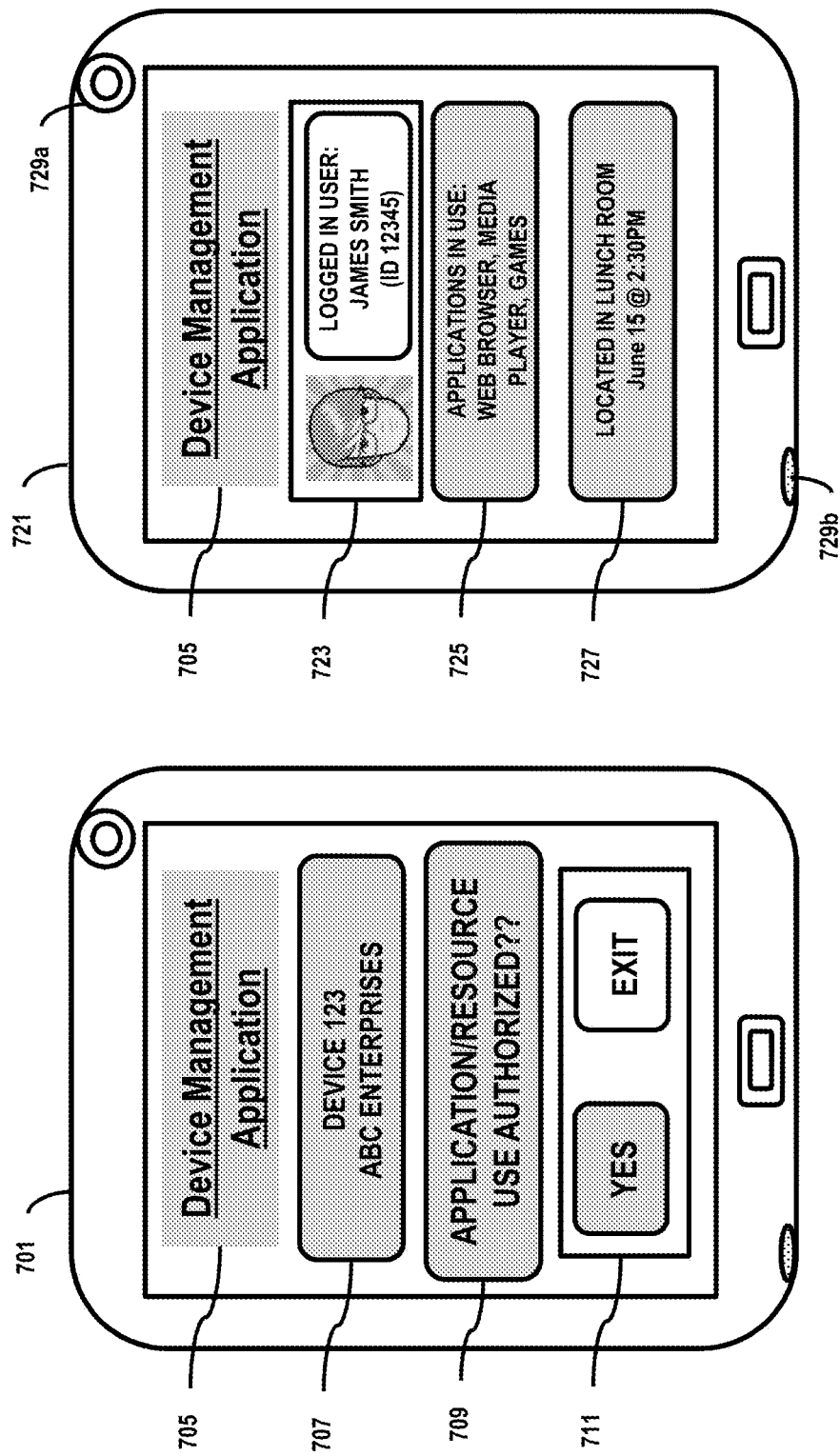
FIGS. 7A through 7C are diagrams of user interfaces for use in the processes of FIGS. 4 through 6, according to various embodiments.
Figure 7B:
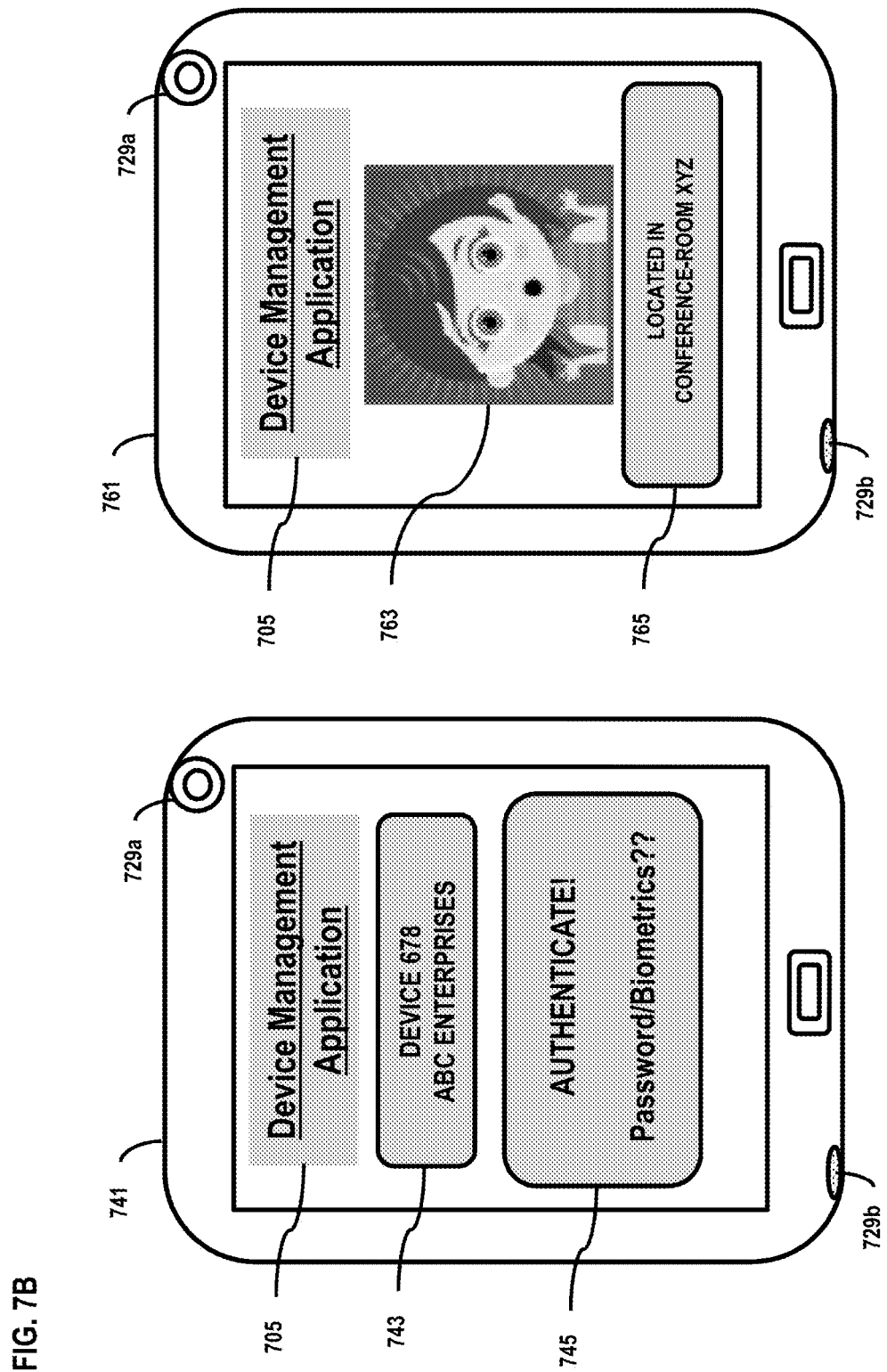
Figure 7C:
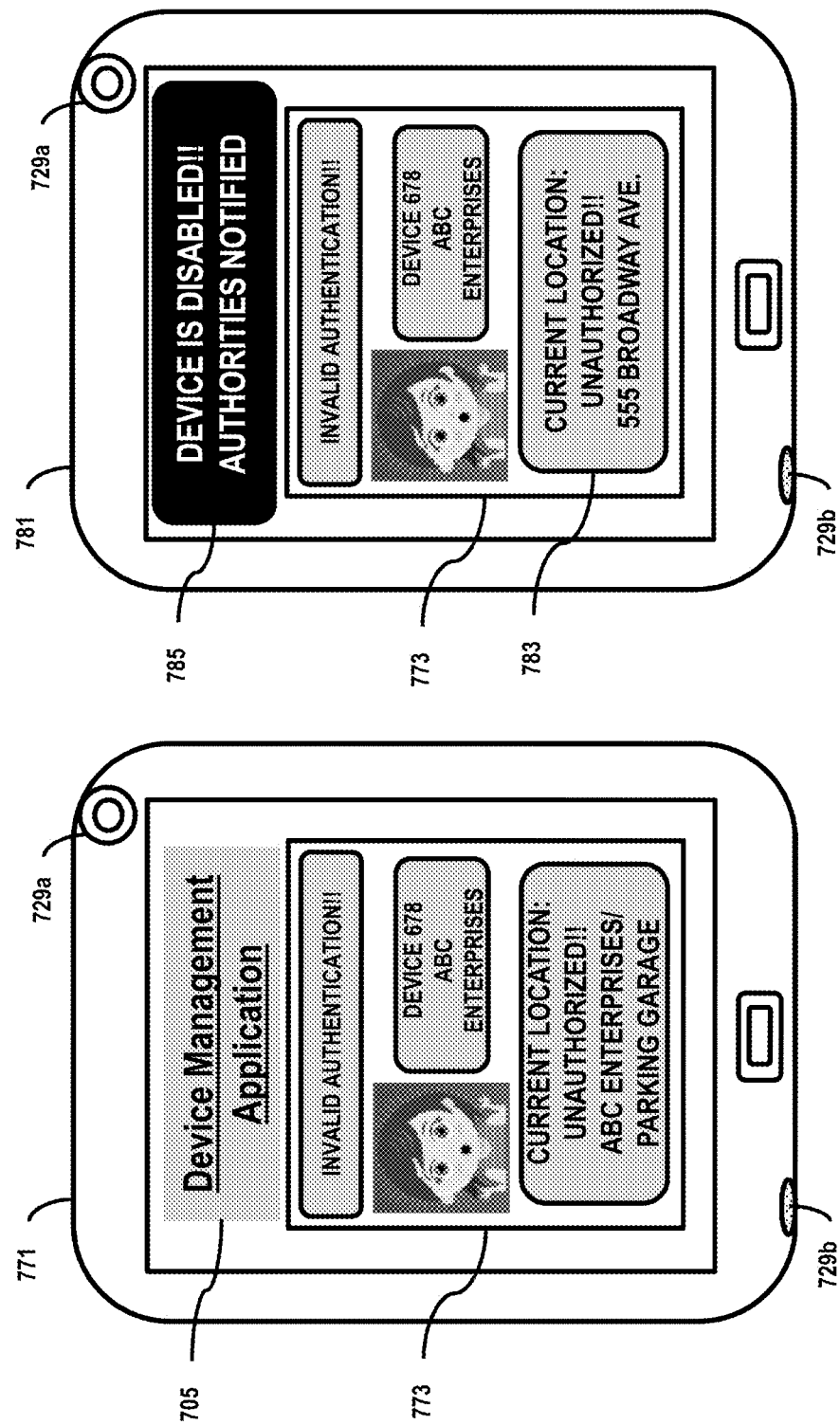

FIGS. 7A through 7C are diagrams of user interfaces for use in the processes of FIGS. 4 through 6, according to various embodiments.

FIG. 7A includes user interfaces 701 and 721, which may be implemented in a user device 101. The user interface 701 shows that a DM application 705 (e.g., DM application 107) is currently being executed on a device identified in 705 as "DEVICE 123" (target device) associated with "ABC ENTERPRISES" (administrator). In one use case scenario, the DM application 705 may determine that an application or a resource in use at or via the target device may be unauthorized, where the DM application 705 may then present a user prompt 709 to inquire if the user of the target device knows/believes that the use of the application/resource is authorized. In one example, a user of the target device may choose via user interface options 711 to confirm that the use is authorized or he may choose to exit the application. In one embodiment, a notification message and information associated with the use of one or more potentially unauthorized applications/resources may be presented at the user interface 721 that may include one or more information items 723. For example, information items 723 may include a media content (e.g., an image, an audio recording, a video clip, etc.) of the current user, which may be captured via one or more sensors 729a or 729b. Further, the information items 723 may include information about the user "James Smith" who may be currently logged in at the device. Furthermore, the notification message may include information about the applications/resources 725, which may be in use at/via the target device. For example, a user may be utilizing a web browser, a media player, playing electronic games, or the like. Additionally, information 727 about the location, time, etc. associated with the use of the applications/resources may be included in the notification message.

FIG. 7B includes user interfaces 741 and 761. The user interface 741 shows that the device management application 705 is running on "DEVICE 678" (target device) associated with "ABC ENTERPRISES" (administrator). In one use case scenario, the DM application 705 may detect a movement of the target device via one or more sensors available at the device. For example, the device may have been resting at a certain position (e.g., flat) and at a certain location (e.g., at a conference room) at "ABC ENTERPRISES" when a user/person picks up the device. The DM application 705 may determine if the movement duration meets a predetermined threshold value, if so, then an authentication request 745 may be presented via the user interface 741. In one embodiment, the DM application 107 may capture the media content and other information associated with the target device and present it at the target device and/or communicate them (e.g., via SMS, email, etc.) to one or more other user devices. In the user interface 761, the DM application 705 may capture an image of a user 763 and determine location information 765 of the target device and then present them via the user interface 761 and/or via one or more other nearby user devices (e.g., a common area display, a projector display, etc.) by utilizing one or more available proximity based communication methods. In one embodiment, the DM application 705 at the user interface 741 may determine if there is a valid authentication at the target device before the information in the user interface 761 is presented transmitted as a notification message to an administrative device or other devices. For example, the information at the user interface 761 may be presented at the "DEVICE 678" so that a user/person who may be handling the device can see that information and if the user/person is able to provide a valid authentication, then it may not be necessary to communicate that information to other devices, administrators, or authorities.

FIG. 7C includes user interfaces 771 and 781. The user interface 771 depicts a notification message 773 including various information items, which may be presented at the "DEVICE 678" (target device) as well as transmitted to one or more user devices, administrative devices, other nearby devices, or the like. In one use case scenario, the notification message 773 indicates that a user/person handling the target device may not have provided a timely or valid authentication credentials. Further, the notification message 773 may include a captured image of the user/person and a current or last known location information of the target device, which may be an authorized or unauthorized location for the target device. In various embodiments, one or more prompts, alerts, messages, or the like may be presented at a target device in order to try and get the attention of the user/person that may be handling the device. In one example, it is possible that an authorized user inadvertently may be carrying/moving a target device outside of an authorized area and once alerted, the user may return the target device to an authorized area/location. However, the user interface 781 depicts a scenario where the user/person handling the target device has continued to move the target device to an unauthorized location 783 without responding to the alerts or notification messages presented at the target device. In one embodiment, the DM application 705 may be configured to disable the target device or to disable some of its functionalities. For example, if the DM application 705 does not receive a valid response to the alerts and determines that the target device has been in an unauthorized location for a certain period of time, then the DM application 705 may disable the target device and include an indication 785 that the target device is disabled and authorities have been notified. In one embodiment, the notification message associated with a target device may be communicated to a local or a remote device management system so additional services for monitoring, tracking, notifying, disabling, etc. may be provided to the administrator of the target device.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The exemplary techniques and systems presented herein enables local monitoring and managing of a plurality of user devices associated with an administrator or a physical location. As an advantage, the device management application can enable an administrator of a group of user devices to locally monitor the use and location of the user devices. Further, the device management application of each device may be configured to initiate one or more responses based on various use and trigger conditions at each device. Furthermore, a device management application may interface with one or more local administrative devices and/or with one or more cloud-based service providers for effectuating the monitoring and management of the user devices within the group. By utilizing the methods and processes, an entity may be able to deter misuse, loss, or theft of its user devices, data, and related resources.

The processes described herein for facilitating a local device management application and procedures for deterring misuse, loss, or theft of mobile devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
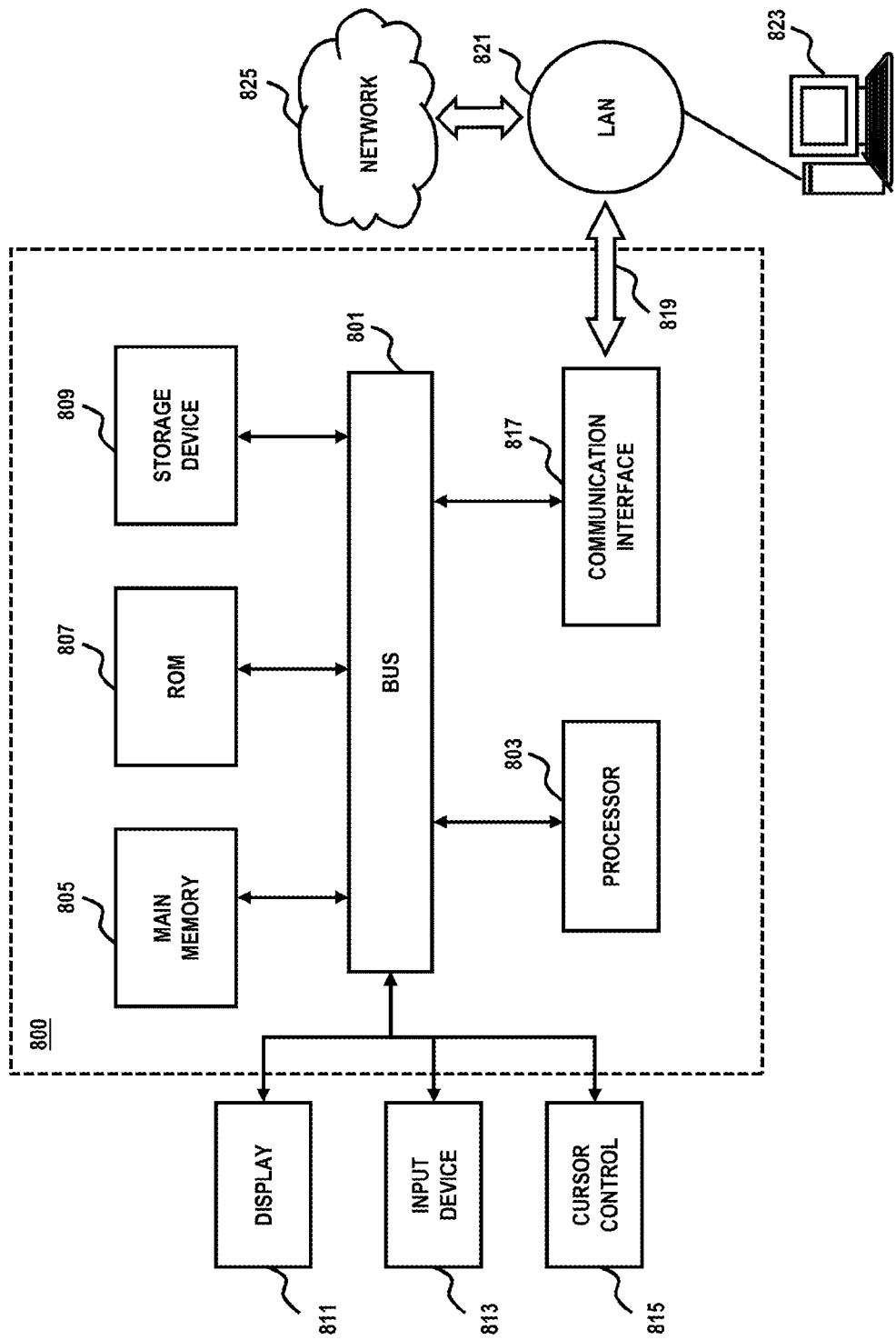
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
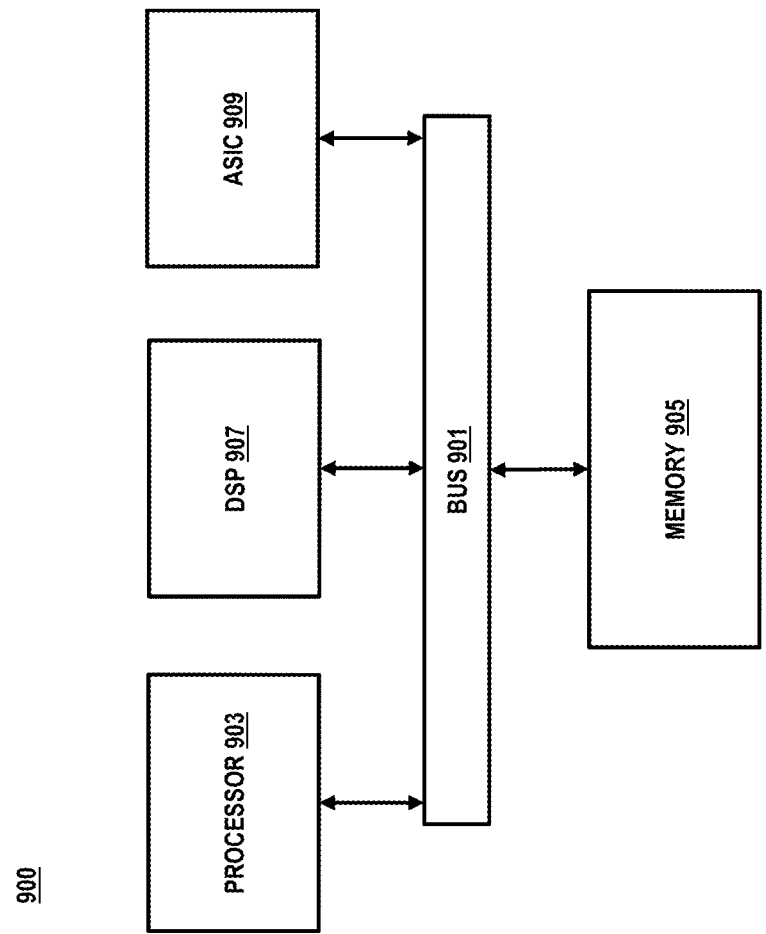
FIG. 9 is a diagram of a chip set that can be used to implement an embodiment of the invention.

FIG. 9 illustrates a chip set 900 upon which an embodiment of the invention may be implemented. Chip set 900 is programmed to provide for implementing a local device management application for deterring misuse, loss, or theft of mobile devices and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 4-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining, by a hardware processor, that a use of a first device at least satisfies one or more use criteria including running one or more blacklisted applications on the first device;
   initiating, by the hardware processor, a capture of one or more screenshots of the one or more blacklisted applications and one or more media samples of a user associated with the use of the first device with one or more internal sensors, one or more external sensors, or a combination thereof associated with the first device, wherein the one or more media samples comprise one or more of an image of the user and a sound recording associated with the user;
   presenting a security message and a request for an authentication at the first device based on the use, wherein the security message includes information that the use of the first device is unauthorized;
   generating, via the hardware processor, a notification message regarding the use; and
   initiating, via the hardware processor, a transmission of the notification message from the first device to a second device based on a failure to provide valid authentication before an expiration of a predetermined time period,
   wherein the notification message includes the one or more screenshots of the one or more blacklisted applications and the one or more media samples.

2. A method of claim 1, further comprising:
   determining location information associated with the first device,
   wherein the notification message includes the location information.

3. A method of claim 1, wherein the one or more use criteria relate to a movement of the first device, the method further comprising:
   detecting the movement based on sensor information associated with the first device.

4. A method of claim 1, further comprising:
   identifying the one or more blacklisted applications in the notification message based on a black list.

5. A method of claim 1, further comprising:
   interfacing with a device management system to enable, to disable, or a combination thereof one or more functions of the first device based on the use.

6. A method of claim 1, further comprising:
   presenting a user interface at the second device for managing the one or more use criteria for the first device.

7. An apparatus comprising:
   a processor; and
   a memory including computer program code,
   the memory and the computer program code causing the processor to perform at least the following:
   determine that a use of a first device at least satisfies one or more use criteria including running one or more blacklisted applications on the first device;
   initiate a capture of one or more screenshots of the one or more blacklisted applications and one or more media samples of a user associated with the use of the first device with one or more internal sensors, one or more external sensors, or a combination thereof associated with the first device, wherein the one or more media samples comprise one or more of an image of the user and a sound recording associated with the user;
   present a security message and a request for an authentication at the first device based on the use, wherein the security message includes information that the use of the first device is unauthorized;
   generate a notification message regarding the use; and
   initiate a transmission of the notification message from the first device to a second device based on a failure to provide valid authentication before an expiration of a predetermined time period,
   wherein the notification message includes the one or more screenshots of the one or more blacklisted applications and the one or more media samples.

8. An apparatus of claim 7, wherein the apparatus is further caused to:
   determine location information associated with the first device,
   wherein the notification message includes the location information.

9. An apparatus of claim 7, wherein the one or more use criteria relate to a movement of the first device, the apparatus is further caused to:
   detect the movement based on sensor information associated with the first device.

10. An apparatus of claim 7, wherein the apparatus is further caused to:
    identify the one or more blacklisted applications in the notification message based on a black list.

11. An apparatus of claim 7, wherein the apparatus is further caused to:
    interface with a device management system to enable, to disable, or a combination thereof one or more functions of the first device based on the use.

12. An apparatus of claim 7, wherein the apparatus is further caused to:
    present a user interface at the second device for managing the one or more use criteria for the first device.

13. A non-transitory computer-readable storage medium carrying one or more sequences of one or more instructions which, when executed by one or more processors, cause the one or more processor to perform the following:
    determine that a use of a first device at least satisfies one or more use criteria including running one or more blacklisted applications on the first device;
    initiate a capture of one or more screenshots of the one or more blacklisted applications and one or more media samples of a user associated with the use of the first device with one or more internal sensors, one or more external sensors, or a combination thereof associated with the first device, wherein the one or more media samples comprise one or more of an image of the user and a sound recording associated with the user;

present a security message and a request for an authentication at a user interface at the first device based on the use, wherein the security message includes information that the use of the first device is unauthorized;

generate a notification message regarding the use; and initiate a transmission of the notification message from the first device to a second device based on a failure to provide valid authentication before an expiration of a predetermined time period, wherein the notification message includes the one or more screenshots of the one or more blacklisted applications and the one or more media samples.

14. A method of claim 1, wherein the capturing the one or more media samples of the user associated with the use of the first device is with one or more external sensors and the one or more external sensors are from one or more other devices in close proximity to the first device.

15. An apparatus of claim 7, wherein the capture the one or more media samples of the user associated with the use of the first device is with one or more external sensors and the one or more external sensors are from one or more other devices in close proximity to the first device.

* * * * *